US012636132B2

(12) United States Patent
Xiao et al.

(10) Patent No.: US 12,636,132 B2
(45) Date of Patent: May 26, 2026

(54) SCANNING METHOD AND SYSTEM OF SCANNING ROD, AND STORAGE MEDIUM

(71) Applicant: Shining 3D Tech Co., Ltd., Zhejiang (CN)

(72) Inventors: Shujuan Xiao, Hangzhou (CN); Xiaojun Chen, Hangzhou (CN); Chao Ma, Hangzhou (CN); Xiaobo Zhao, Hangzhou (CN)

(73) Assignee: SHINING 3D TECH CO., LTD., Hangzhou (CN)

( * ) Notice: Subject to any disclaimer, the term of this patent is extended or adjusted under 35 U.S.C. 154(b) by 0 days.

(21) Appl. No.: 19/073,290

(22) Filed: Mar. 7, 2025

(65) Prior Publication Data

US 2025/0375270 A1 Dec. 11, 2025

(30) Foreign Application Priority Data

Jun. 6, 2024 (CN) .......................... 202410726547.3

(51) Int. Cl.
*A61C 9/00* (2006.01)

(52) U.S. Cl.
CPC ............ *A61C 9/0053* (2013.01); *A61C 9/002* (2013.01)

(58) Field of Classification Search
CPC .............................. A61C 9/002; A61C 9/0053
See application file for complete search history.

(56) References Cited

U.S. PATENT DOCUMENTS

| | | | | |
|---|---|---|---|---|
| 9,157,733 | B2 * | 10/2015 | Dillon | ................ G01B 11/2527 |
| 2006/0275736 | A1 * | 12/2006 | Wen | .......................... A61C 9/00 |
| | | | | 433/213 |
| 2015/0320320 | A1 * | 11/2015 | Kopelman | ............. A61B 6/032 |
| | | | | 433/215 |
| 2018/0005371 | A1 * | 1/2018 | Sabina | ................. A61C 9/0046 |

(Continued)

FOREIGN PATENT DOCUMENTS

| | | |
|---|---|---|
| CN | 114828773 A | 7/2022 |
| CN | 217409022 U | 9/2022 |

(Continued)

OTHER PUBLICATIONS

Wang Guoli, Construction principle of ground laser point cloud model, Surveying and Mapping Press, published Jun. 30, 2017.

(Continued)

*Primary Examiner* — Nicholas D Lucchesi
(74) *Attorney, Agent, or Firm* — Scully, Scott, Murphy & Presser, P.C.

(57) ABSTRACT

The present disclosure provides a scanning method and system of a scanning rod, and a storage medium. The method includes: scanning a scanned scene in a first scanning rod assembling status to obtain first scanning data; scanning the scanned scene in a second scanning rod assembling status to obtain second scanning data; and obtaining position information of assembly sites in the scanned scene based on the first scanning data and the second scanning data. By using a batch scanning manner in the present disclosure, the scanning rods are installed at a third assembly site and a first assembly site for scanning to obtain the first scanning data; the scanning rods are installed at the third assembly site and a second assembly site for scanning to obtain the second scanning data.

13 Claims, 7 Drawing Sheets register and fuse

(56)                    References Cited

U.S. PATENT DOCUMENTS

2023/0248483  A1      8/2023   Vergoullis et al.
2024/0122685  A1      4/2024   Salloum

FOREIGN PATENT DOCUMENTS

| CN | 117064582 | A  | 11/2023 |
|----|-----------|----|---------|
| DE | 102011053336 | A1 | 3/2013 |
| JP | 6507293 | B1 | 4/2019 |
| JP | 2023536171 | A | 8/2023 |
| WO | 2022060017 | A1 | 3/2022 |
| WO | 2023213252 | A1 | 11/2023 |

OTHER PUBLICATIONS

The search report of CN application No. 202410726547.3 issued on
Jul. 16, 2024.
First Office Action of CN application No. 202410726547.3 issued
on Jul. 16, 2024.
The first office action of counterpart JP application No. 2025-
025440 issued on Mar. 11, 2025.
Extended European search report dated May 30, 2025 received in
European Patent Application No. 24217661.8.

* cited by examiner register and fuse

SCANNING METHOD AND SYSTEM OF SCANNING ROD, AND STORAGE MEDIUM

TECHNICAL FIELD

The present disclosure relates to the technical field of scanning with a scanning rod, and in particular, relates to a scanning method and system of a scanning rod, and a storage medium.

BACKGROUND

Digital impression collection for dental implant restoration involves connecting a scanning rod to an implant/abutment through a tightened screw for scanning in an oral cavity to obtain a scanned image, and the scanned image is then analyzed to acquire feature information of the scanning rod to determine the position of the implant. In practical applications, there may be situations where adjacent implants are too close to each other and two scanning rods cannot be put in place simultaneously. In the related art, when scanning rods are used for digital impression making, the problem that adjacent implants are too close to each other and two scanning rods cannot be put in place simultaneously cannot be effectively solved, resulting in problems that complete feature information of the scanning rods in the oral cavity cannot be obtained, and the exact position of the implant cannot be determined. Therefore, the related art has many shortcomings.

SUMMARY

Embodiments of the present disclosure provide a scanning method and system of a scanning rod, and a storage medium.

In a first aspect, the Embodiments of the present disclosure provide a scanning method of a scanning rod, which is applied to a scanned scene with scanning rods. The method includes:

scanning a scanned scene in a first scanning rod assembling status to obtain first scanning data, where scanning rods are assembled at a third assembly site and a first assembly site in the scanned scene in the first scanning rod assembling status;

scanning the scanned scene in a second scanning rod assembling status to obtain second scanning data, where the scanning rods are assembled at the third assembly site and a second assembly site in the scanned scene in an oral cavity in the second scanning rod assembling status; and obtaining position information of the assembly sites in the scanned scene based on the first scanning data and the second scanning data.

In some alternative embodiments of the present disclosure, a distance between the first assembly site and the second assembly site is less than a preset threshold.

In some alternative embodiments of the present disclosure, when scanning the scanned scene in the first scanning rod assembling status, the scanning rods at the first assembly site and the third assembly site are scanned to obtain the first scanning data;

a display image is acquired based on the first scanning data;

when scanning the scanned scene in the second scanning rod assembling status, data of the scanning rod corresponding to the first assembly site in the display image is cancelled, and the scanning rods at the second assembly site and the third assembly site are scanned to obtain the second scanning data; and the display image is updated based on the second scanning data.

In some alternative embodiments of the present disclosure, an assembling status of the scanning rod at the third assembly site in the scanned scene in the first scanning rod assembling status is the same as an assembling status of the scanning rod at the third assembly site in the scanned scene in the second scanning rod assembling status, and the obtaining position information of the assembly sites in the scanned scene based on the first scanning data and the second scanning data further includes:

register the first scanning data with the second scanning data to obtain a registered image; and obtaining the position information of the assembly sites in the scanned scene based on the registered image.

In some alternative embodiments of the present disclosure, the obtaining position information of the assembly sites in the scanned scene based on the first scanning data and the second scanning data includes:

determining an orientation vector between the scanning rods at the first assembly site and the third assembly site based on the first scanning data;

determining an orientation vector between the scanning rods at the second assembly site and the third assembly site based on the second scanning data; and determining the position information of the assembly sites in the scanned scene based on the orientation vector between the scanning rods at the first assembly site and the third assembly site as well as the orientation vector between the scanning rods at the second assembly site and the third assembly site.

In some alternative embodiments of the present disclosure, the assembling status of the scanning rod at the third assembly site in the scanned scene in the first scanning rod assembling status is the same as an assembling status of the scanning rod at the third assembly site in the scanned scene in the second scanning rod assembling status, and the obtaining position information of the assembly sites in the scanned scene based on the first scanning data and the second scanning data further includes:

determining an orientation vector between mark points on a surface of the scanning rod at the third assembly site based on the first scanning data;

determining an orientation vector between the mark points on the surface of the scanning rod at the third assembly site based on the second scanning data; and determining the position information of the assembly sites in the scanned scene based on the orientation vectors between the mark points on the surface of the scanning rod at the third assembly site.

In some alternative embodiments of the present disclosure, the scanning rods are provided with feature patterns, and the obtaining the position information of the assembly sites in the scanned scene based on the registered image includes:

determining the position information of the first assembly site, the second assembly site, and the third assembly site based on the feature patterns of all the scanning rods in the registered image; or, the scanning rods are provided with mark points, and the obtaining the position information of the assembly sites in the scanned scene based on the registered image includes:

determining relative position information among the first assembly site, the second assembly site, and the third assembly site based on the mark points on the scanning rods in the registered image.

In a second aspect, an embodiment of the present disclosure provides a scanning system of a scanning rod, which includes:

a first scanning module, configured to scan a scanned scene in a first scanning rod assembling status to obtain first scanning data, where scanning rods are assembled at a third assembly site and a first assembly site in the scanned scene in the first scanning rod assembling status;

a second scanning module, configured to scan the scanned scene in a second scanning rod assembling status to obtain second scanning data, where the scanning rods are assembled at the third assembly site and a second assembly site in the scanned scene in an oral cavity in the second scanning rod assembling status; and a position information acquiring module, configured to obtain position information of the assembly sites in the scanned scene based on the first scanning data and the second scanning data.

In a third aspect, an embodiment of the present disclosure provides a terminal device, which includes a memory, a processor, and a computer program stored in the memory and executable on the processor, and the processor implements the aforementioned method when executing the computer program.

In a fourth aspect, an embodiment of the present disclosure provides a non-transitory computer-readable storage medium. The non-transitory computer-readable storage medium stores a computer program, and the computer program, when executed by a processor, implements the aforementioned method.

BRIEF DESCRIPTION OF THE DRAWINGS

To describe the technical solutions in the embodiments of the present disclosure more clearly, the accompanying drawings required for describing the embodiments or existing technologies are briefly described below. Apparently, the accompanying drawings in the following description show some embodiments of the present disclosure, and a person of ordinary skill in the art may still derive other drawings from these accompanying drawings without creative efforts.

DETAILED DESCRIPTION OF THE INVENTION

Figure 1:
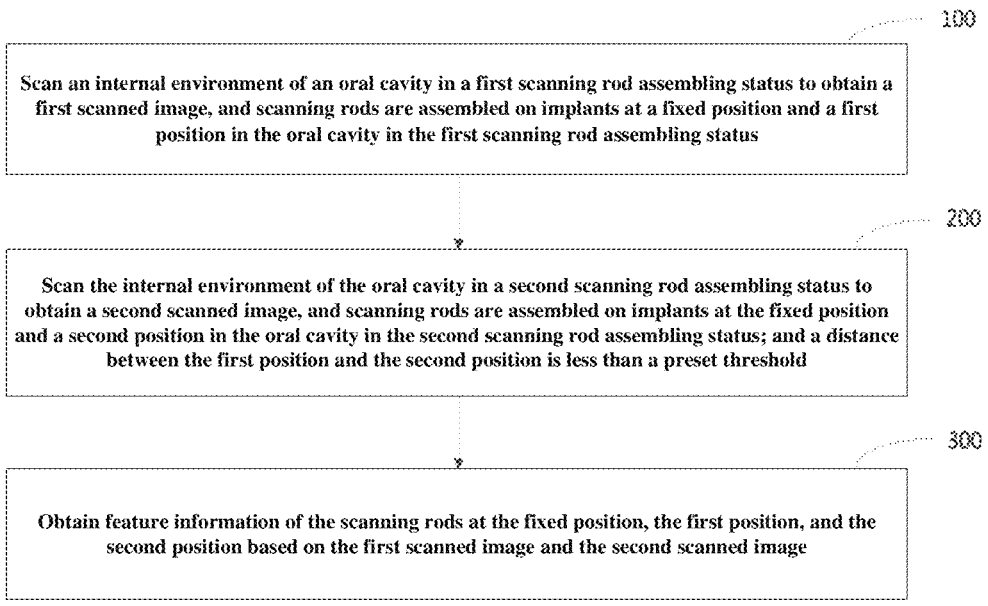
FIG. 1 is a schematic diagram of a scanning method of a scanning rod provided in an embodiment of the present disclosure.

Embodiments of the present disclosure provide a scanning method, which can effectively solve the problem that complete position information of the scanning rods in the oral cavity cannot be obtained because when adjacent implants are too close to each other, two scanning rods cannot be put in place simultaneously.

In the following description, specific details such as a specific system structure and technology are provided for description rather than limitation, so as to thoroughly understand embodiments of the present disclosure. However, it should be clear to those skilled in the art that the present disclosure can also be implemented in other embodiments without these specific details. In other cases, detailed descriptions of well-known systems, apparatuses, circuits, and methods are omitted to prevent unnecessary details from obscuring the description of the present disclosure.

It should be understood that when used in the specification and appended claims of the present disclosure, the term "include" indicates the presence of the described features, entirety, steps, operations, elements, and/or components, but does not exclude the presence or addition of one or more other features, entirety, steps, operations, elements, components, and/or sets thereof.

It should be further understood that the term "and/or" used in the specification and appended claims of the present disclosure refers to any combination and all possible combinations of one or more associated listed items, including these combinations.

As used in the specification and appended claims of the present disclosure, the term "if" may be interpreted as "when", "once", "in response to a determination", or "in response to detection of" depending on the context. Similarly, the phrases "if determined" or "if [a described condition or event] is detected" may be interpreted as meaning "once determined", "in response to a determination", "once [the described condition or event] is detected", or "in response to detection of [the described condition or event]" depending on the context.

In addition, in descriptions of the specification and appended claims of the present disclosure, terms such as "first", "second", and "third" are merely used for distinguishing descriptions, and cannot be understood as an indication or implication of relative importance.

Reference to "an embodiment" or "some embodiments" described in the specification of the present disclosure means that a specific feature, structure, or characteristic described in combination with some embodiments is included in one or more embodiments of the present disclosure. Therefore, the statements "in an embodiment", "in some embodiments", "in some other embodiments", "in further some embodiments", etc. in different places in the specification do not necessarily refer to the same embodiment, but mean "one or more but not all embodiments", unless otherwise specially emphasized in other ways. The terms "include", "comprise", "have", and their variations all mean "include but not limited to", unless otherwise alternative emphasized.

Digital impression collection for dental implant restoration involves connecting a scanning rod to an implant through a tightened screw for scanning in an oral cavity to obtain a scanned image, and the scanned image is then analyzed to acquire feature information of the scanning rod to determine the position of the implant. In practical applications, there may be situations where adjacent implants are too close to each other and two scanning rods cannot be put in place simultaneously. In the related art, when scanning rods are used for digital impression making, the scanning rods are usually finely ground until two scanning rods can be put in place simultaneously, and then a silicone rubber mold is taken. The method in the related art may cause deformation of a data surface of the scanning rods or incomplete data of the scanning rods, resulting in low data matching degree and an incorrect implantation site, which is not conducive to accurately determining the position of an implant.

The scanning method of the present disclosure can effectively solve the problem that two scanning rods cannot be put in place simultaneously when adjacent implants are too close to each other. By performing batch scanning and fusing images obtained by batch scanning, the data surface of the scanning rods is ensured not to be deformed, complete feature information of the scanning rods in an oral cavity can be obtained, the matching degree of the scanning data is high, and the position of an implant can be accurately determined.

In the batch scanning manner of the present disclosure, the first scanning is performed in a first scanning rod assembling status and the second scanning is performed in a second scanning rod assembling status to obtain first scanning data and second scanning data respectively. During the two scanning processes, there are three assembly sites of scanning rods: a first assembly site, a second assembly site, and a third assembly site. When the scanning rods are arranged and assembled in an oral cavity, the two assembly sites where the scanning rods interfere with each other are determined as the first assembly site and the second assembly site, and the assembly site where there is no interference is determined as the third assembly site. The first assembly site and the second assembly site are usually close in distance, usually are adjacent or separated by one assembly site. Interference may also occur due to improper arrangement by a user. A distance between the first assembly site and the second assembly site is less than a preset threshold. An assembling status of the scanning rod at the third assembly site in a scanned scene in the first scanning rod assembling status is the same as that of the scanning rod at the third assembly site in a scanned scene in the second scanning rod assembling status.

As shown in FIG. 1, FIG. 1 is a schematic diagram of a scanning method of a scanning rod provided in an embodiment of the present disclosure, the method includes:

step 100: a scanned scene in a first scanning rod assembling status is scanned to obtain first scanning data, where scanning rods are assembled at a third assembly site and a first assembly site in the scanned scene in the first scanning rod assembling status;

step 200: the scanned scene in a second scanning rod assembling status is scanned to obtain second scanning data, where the scanning rods are assembled at the third assembly site and a second assembly site in an oral cavity in the second scanning rod assembling status; and step 300: position information of the assembly sites in the scanned scene is obtained based on the first scanning data and the second scanning data.

Digital impression collection for dental implant restoration involves connecting a scanning rod to an implant through a tightened screw for scanning in an oral cavity to obtain a scanned image, and the position where the scanning rod is to be assembled is called an assembly site. In the embodiments of the present disclosure, a batch scanning method is used in the situation where adjacent implants are too close to each other and two scanning rods cannot be put in place simultaneously.

Figure 2:
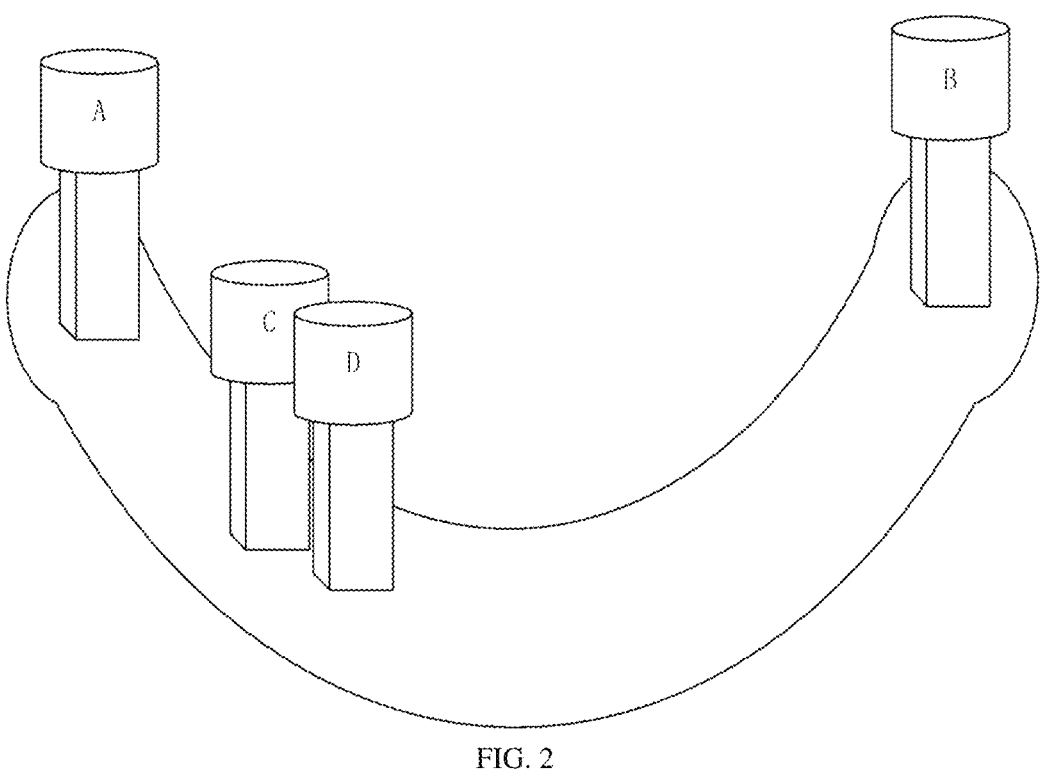
FIG. 2 is a schematic diagram illustrating adjacent implants being too close to each other provided in an embodiment of the present disclosure.

As shown in FIG. 2, FIG. 2 shows a schematic diagram illustrating adjacent implants being too close to each other, if the distance between a first assembly site C and a second assembly site D is less than a preset threshold, it is determined that implants corresponding to the C assembly site and the D assembly site are adjacent implants. Because the adjacent implants at the C and D assembly sites are too close to each other, two scanning rods cannot be put in place simultaneously.

It should be noted that since the scanning rods are installed on the implants, the assembly sites corresponding to the scanning rods are the positions of the implants. In the embodiments of the present disclosure, in addition to the situation where two adjacent implants are too close to each other, the present disclosure is also applicable to other situations in practical operation, such as a situation where three or more consecutive teeth are very close to each other, or a situation where scanning rods cannot be put in place on the implants because the scanning rods are improperly arranged in an oral cavity and interfere with each other. The present disclosure will provide a detailed description of the situation where two adjacent implants are too close to each other based on FIG. 2 to FIG. 4. The principle of the present disclosure is applicable to all situations where scanning rods cannot be put in place simultaneously. The A, B, C, and D marked in FIG. 2 to FIG. 4 refer to the positions where the scanning rods are assembled on the implants at positions A, B, C, and D. Therefore, the A, B, C, and D alternative refer to the positions where the scanning rods are assembled, rather than the names of the scanning rods.

In the embodiments of the present disclosure, scanning rods assembled on implants during the first scanning process are referred to as first scanning rods. Scanning is performed based on a scanned scene in a first scanning rod assembling status, where the scanned scene usually refers to a scene in an oral cavity. In the first scanning rod assembling status, scanning rods are arranged at the first assembly site and the third assembly site.

In the embodiments of the present disclosure, the first assembly site and the second assembly site refer to the assembly positions corresponding to two scanning rods when the two scanning rods are too close to each other. Alternatively, when the distance between the two scanning rods is less than a fixed value, it can be determined that the two scanning rods are too close to and interfere with each other. In such a case, the assembly positions corresponding to the two scanning rods are the first assembly site and the second assembly site respectively. It should be noted that since the diameter of the scanning rods is known data, when the distance between the scanning rods is less than a fixed value, the distance between the first assembly site and the second assembly site is also less than a known threshold. That is, the distance between the first assembly site and the second assembly site is less than a preset threshold, and the preset threshold can be determined based on the fixed value and the diameter of the scanning rods, which is not limited in the present disclosure.

For example, if the distance between C and D in FIG. 2 is less than the preset threshold, C can be defined as the first assembly site, and correspondingly, D can be defined as the second assembly site; or D can be defined as the first assembly site, and correspondingly, C can be defined as the second assembly site, which is not limited in the present disclosure.

The third assembly site refers to the assembly position where the distance between the third assembly site and the first assembly site or the second assembly site is greater than the preset threshold, and the scanning rod on this assembly site does not interfere with the scanning rods on other assembly sites. For example, if the distance between A and C and the distance between A and D in FIG. 2 are both greater than the preset threshold, A can be determined as the third assembly site. Similarly, if the distance between B and C and the distance between B and D are both greater than the preset threshold, B can be determined as the third assembly site. The descriptions thereof are not repeated in the present disclosure. It should be noted that if the distance between A and B is greater than the preset threshold, both A and B can be determined as the third assembly sites. If the distance between A and B is less than the preset threshold, and batch scanning is performed due to interference between C and D, only one of A and B can be determined as the third assembly site.

It should be noted that the aforementioned distances can be determined by the distances between the assembly sites in scanning data, or by the distances between the scanning rods in a digital arrangement scheme of scanning rods, where the digital arrangement scheme of scanning rods is generated based on the assembly sites, i.e., the distances between the scanning rods are fixed values. Then, the distances between the assembly sites can be calculated by converting the diameter of the scanning rods, which is not limited in the present disclosure.

Figure 3:
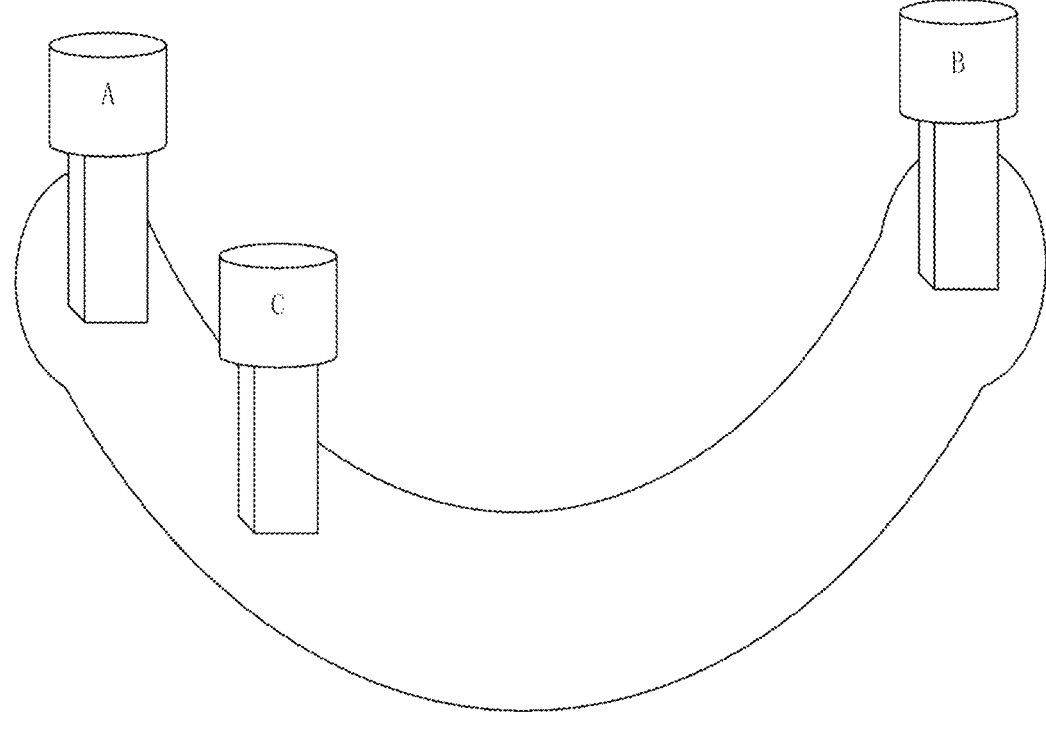
FIG. 3 is a schematic diagram of a scanned scene in a first scanning rod assembling status provided in an embodiment of the present disclosure.

As shown in FIG. 2 and FIG. 3, FIG. 2 is a schematic diagram illustrating adjacent implants being too close to each other provided in an embodiment of the present disclosure, and FIG. 3 shows a schematic diagram of a scanned scene in a first scanning rod assembling status, in a possible implementation, the distance between positions C and D is less than a preset threshold, implants at the positions C and D are adjacent implants, scanning rods at the positions C and D may interfere with each other, so the scanning rods cannot be put in place at C and D simultaneously. In such a case, the assembly site C corresponding to one of the scanning rods is referred to as the first assembly site, and correspondingly, the assembly site D corresponding to the other scanning rod is referred to as the second assembly site. If the distance between A and C and the distance between A and D are both greater than the preset threshold, A is the third assembly site. If the distance between B and C and the distance between B and D are both greater than the preset threshold, and the distance between B and A prints the preset threshold, both B and A are the third assembly sites. In the first scanning rod assembling status shown in FIG. 3, the three first scanning rods at the third assembly sites (A and B) and the first assembly site (C) are scanned to obtain the first scanning data.

In another possible implementation, on the basis that the scanning rods at C and D interfere with each other in the previous embodiment, if the distance between A and B is greater than the preset threshold (i.e., no interference occurs, in such a case, the distance between the scanning rods corresponding to A and B is greater than the fixed value), but the distance between A and C is less than the preset threshold, it indicates that the scanning rods at A and C interfere with each other, that is, the scanning rods at A and C cannot be placed simultaneously. For the four assembly sites A, B, C, and D in the embodiment, only B can be used as the third assembly site.

In another possible implementation, on the basis that the scanning rods at C and D interfere with each other in the previous embodiment, the scanning rods at A and C do not interfere with each other, the scanning rods at A and D do not interfere with each other, the scanning rods at B and C do not interfere with each other, and the scanning rods at B and D do not interfere with each other. If the scanning rods at A and B interfere with each other, C and D can be determined as the first assembly site and the second assembly site, and A or B is determined as the third assembly site; or A and B can be determined as the first assembly site and the second assembly site, and C or D is determined as the third assembly site. For example, the scanning rods can be assembled at A and C for scanning, at A and D for scanning, and at B and C for scanning, and the overall distribution information of A, B, C, and D can be acquired by three times of scanning.

In another possible implementation, on the basis that the scanning rods at C and D interfere with each other in the previous embodiment, if the distance between A and C is less than the preset threshold and the distance between B and D is less than the preset threshold, it indicates that the scanning rods at A and C interfere with each other, i.e., the scanning rods at A and C cannot be placed simultaneously; the scanning rods at C and D interfere with each other, i.e., the scanning rods at C and D cannot be placed simultaneously; and the scanning rods at B and D also interfere with each other, i.e., the scanning rods at B and D cannot be placed simultaneously. In such a case, none of the four assembly sites A, B, C, and D in the embodiment can be used as a position of the third assembly site, and a position where the scanning rod does not interfere with the scanning rods at the first assembly site and the second assembly site is to be selected as the third assembly site.

Figure 4:
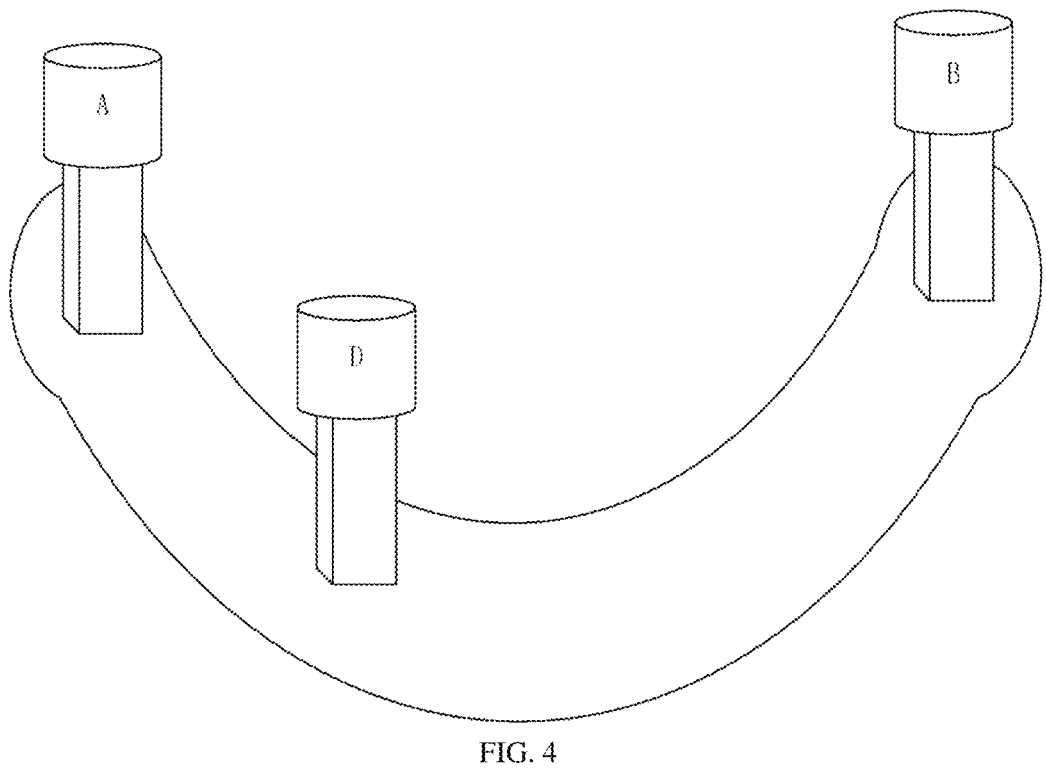
FIG. 4 is a schematic diagram of a scanned scene in a second scanning rod assembling status provided in an embodiment of the present disclosure.

In the embodiments of the present disclosure, scanning rods assembled on implants during the second scanning process are referred to as second scanning rods. As shown in FIG. 2 and FIG. 4, FIG. 2 is a schematic diagram illustrating adjacent implants being too close to each other provided in an embodiment of the present disclosure, and FIG. 4 shows a schematic diagram of a scanned scene in a second scanning rod assembling status, the distance between positions C and D is less than a preset threshold, and implants at the positions C and D are adjacent implants. The assembly site C corresponding to one of the scanning rods is referred to as the first assembly site, and correspondingly, the assembly site D corresponding to the other scanning rod is referred to as the second assembly site. If the distance between A and C or D is greater than the preset threshold, A is the third assembly site. Similarly, if the distance between B and C or D is greater than the preset threshold, B is the third assembly site. In the second scanning rod assembling status shown in FIG. 4, the three second scanning rods at the third assembly sites (A and B) and the second assembly site (D) are scanned to obtain the second scanning data. Both the first scanning data and the second scanning data are three-dimensional data.

Furthermore, it should be further noted that in the embodiments of the present disclosure, in a specific scanning process, the scanning rods at all assembly sites arranged in an oral cavity can be scanned, or the scanning rods at some assembly sites can be scanned. Alternatively, the minimum number of scanning rods can be three, that is, corresponding to the first assembly site, the second assembly site, and the third assembly site, respectively. Of course, more scanning rods correspond to higher accuracy, which is not limited in the present disclosure.

It should be noted that the first assembly site and the second assembly site are not fixed in the present disclosure, and C and D in FIG. 2 to FIG. 4 are only exemplary. The position where the scanning rod on any one of the adjacent implants is assembled can be the first assembly site, and correspondingly, the other one can be the second assembly site, that is, C can also be used as the second assembly site, and D can also be used as the first assembly site. The method for determining the third assembly site and various situations of the third assembly site are as described above, and are not alternative limited here.

In the embodiments of the present disclosure, the first scanning data and the second scanning data are three-dimensional data, mark points on the scanning rods are provided with mark points, and the obtaining the first scanning data and the second scanning data includes:

S1: when scanning the scanned scene in the first scanning rod assembling status, the mark points on the scanning rods at the first assembly site and the third assembly site are scanned to obtain the first scanning data.

Figure 5A:
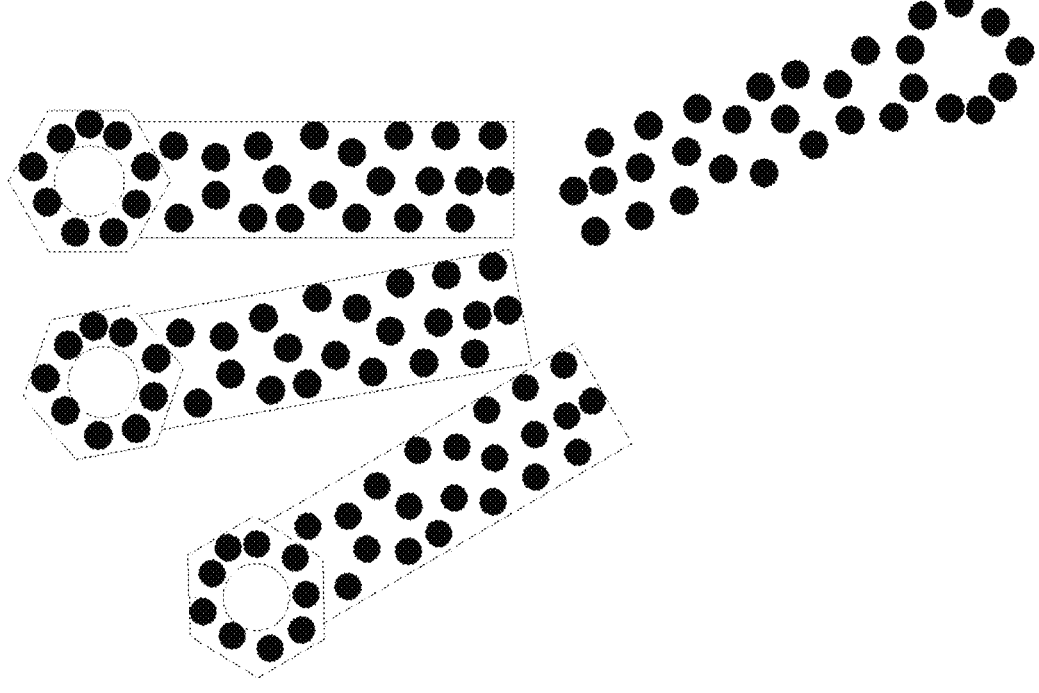
FIG. 5*a* and FIG. 5*b* are schematic diagrams of a process of generating a scanned image provided in an embodiment of the present disclosure.
Figure 5B:
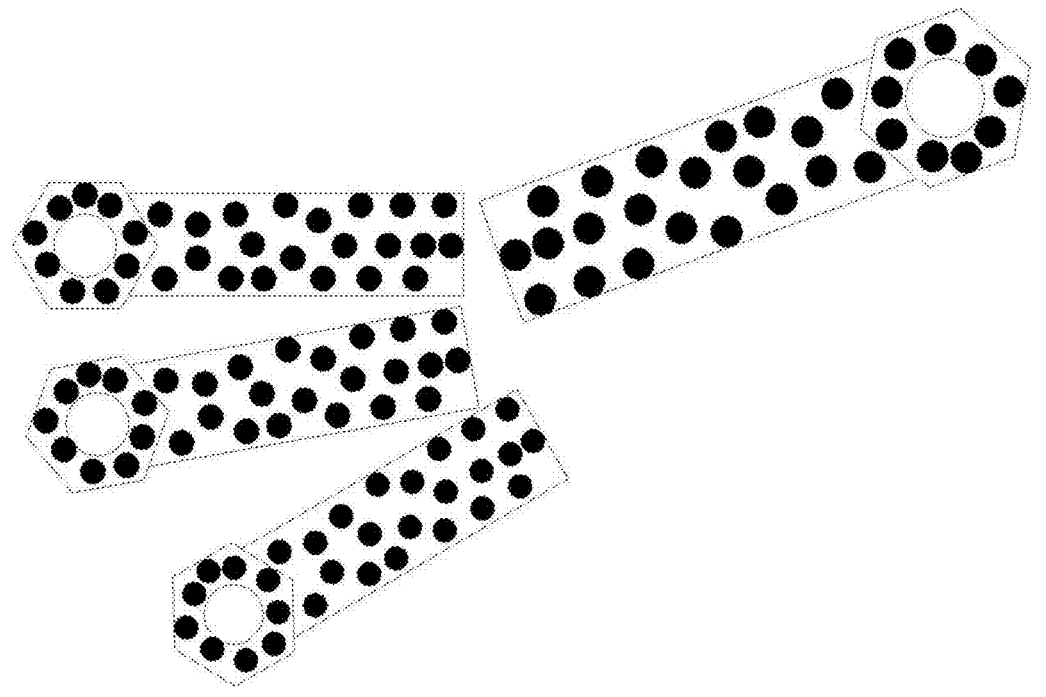

In the embodiments of the present disclosure, by scanning the mark points on the scanning rods, three-dimensional scanning data of the scanning rods is generated based on the mark points, and a scanned image is generated based on the three-dimensional scanning data of the scanning rods. FIG. 5a shows top views of the scanning rods, where the hexagonal areas are top views of main bodies of the scanning rods, and the rectangular areas are top views of extension rods of the scanning rods. In the present disclosure, only the main bodies of the scanning rods are shown in FIG. 1 to FIG. 4. As shown in FIG. 5a and FIG. 5b, both the main bodies of the scanning rods and the extension rods of the scanning rods have mark points (black dots in FIG. 5a and FIG. 5b). Three-dimensional data information of the scanning rods is acquired by scanning the mark points on the scanning rods. In the first scanning rod assembling status, as shown in FIG. 3, the mark points on the scanning rods at the first assembly site C and the third assembly sites A and B are scanned to obtain the first scanning data.

S2: a display image is acquired based on the first scanning data.

In some embodiments, a visualized display image can be formed based on the first scanning data. It should be noted that the visualized image can be generated. In specific processing, even if no visualized display image is generated, subsequent analysis can be performed directly based on the first scanning data. As shown in FIG. 5b, the first scanning data is generated by acquiring the three-dimensional data of the scanning rods through the black mark points scanned. The black mark points are used for only defining the mark points in FIG. 5b.

S3: when scanning the scanned scene in the second scanning rod assembling status, data of the scanning rod corresponding to the first assembly site in the display image is cancelled, and the scanning rods at the second assembly site and the third assembly site are scanned to obtain the second scanning data; and the display image is updated based on the second scanning data.

In the embodiments of the present disclosure, refer to the scanning process in the first scanning rod assembling status in S1 for the scanning process in the second scanning rod assembling status, and the descriptions thereof are not repeated herein. As shown in FIG. 4, in response to scanning is performed in the second scanning rod assembling status, it is necessary to cancel the data of the scanning rod at the first assembly site C in the first scanning data, and only the mark points on the scanning rod at the second assembly site D and the mark points on the scanning rods in the vicinity (e.g., sites A and B) of the second assembly site D are scanned.

It should be noted that in the embodiments of the present disclosure, the data of the scanning rod at the first assembly site C in the first scanning data may also be hidden, that is, not visualized for display.

In a possible implementation, multiple third assembly sites may be provided between the assembly site A and the assembly site D or between the assembly site B and the assembly site D. In the scanning process, it is unnecessary to scan all the third assembly sites, but only the mark points on the scanning rods at the third assembly sites in the vicinity of the second assembly site D are scanned, which is conducive to reducing the time cost of scanning and improving the scanning efficiency.

The mark points on the scanning rods in the vicinity are scanned based on the mark points on the scanning rod at the second assembly site to obtain the second scanning data. The first data obtained in step S1 is updated and displayed based on the obtained second scanning data.

In the embodiments of the present disclosure, there are two methods to obtain the position information of each assembly site based on the first scanning data and the second scanning data. The first method is to update the second scanning data based on the first scanning data to obtain an updated image of the second scanning data. The updated image of the second scanning data includes coordinates of the third assembly site and the second assembly site. By combining coordinates of the third assembly site and the first assembly site in the first scanning data, the position information of the first assembly site, the second assembly site, and the third assembly site is identified. By the first method, the mark points of the scanning rods in the image of the first scanning data and the updated image are identified respectively, and the position information of each assembly site is obtained. By performing batch scanning, the first scanning data and the second scanning data are obtained, and then by performing identification based on the updated second scanning data, accurate position information of each assembly site is obtained, thereby effectively solving the problem that complete and accurate position information of the assembly sites of the scanning rods cannot be obtained when adjacent implants are too close to each other and two scanning rods cannot be placed simultaneously. Also, by the method of updating the second image with the first image, a possible offset error of the third assembly site in the first scanning data and the second scanning data is reduced, which is conducive to obtaining complete position information of the assembly sites of the scanning rods in an oral cavity, improving the matching degree of the scanning data, and thus facilitating accurate determination of the position of an implant.

The second method is to register the first scanning data with the second scanning data. In some embodiments, the assembling status of the scanning rod at the third assembly site in the scanned scene in the first scanning rod assembling status is the same as the assembling status of the scanning rod at the third assembly site in the scanned scene in the second scanning rod assembling status. The obtaining position information of the assembly sites in the scanned scene based on the first scanning data and the second scanning data further includes:

the first scanning data is registered with the second scanning data to obtain a registered image; and the position information of the assembly sites in the scanned scene is obtained based on the registered image.

In some embodiments, the registered image is obtained and analyzed to obtain the position information of each assembly site. By the second method, based on the mark points at the third assembly site in the first scanning data and the second scanning data, the first scanning data is registered with the second scanning data to obtain the registered image, and information analysis is performed based on the registered image, thereby effectively solving the problem that complete and accurate position information of the assembly sites of the scanning rods cannot be obtained when adjacent implants are too close to each other and two scanning rods cannot be placed simultaneously, and providing a visual image interaction mode.

For the first method of analyzing the image of the first scanning data and the updated image respectively, the embodiments of the present disclosure provides two embodiments to obtain the updated image of the second scanning data. In the first embodiment, firstly a standard orientation vector between the mark points on the scanning rods at the third assembly sites is obtained by analyzing the coordinates of the third assembly sites A and B in the first scanning data. Since the position information of the third assembly sites is unchanged, a non-standard orientation vector of the mark points on the scanning rods at the third assembly sites in the second scanning data should be the same as the standard orientation vector in the first scanning data. The non-standard orientation vector in the second scanning data is obtained by the standard orientation vector, and the updated image of the second scanning data is obtained by updating the second scanning data in this process. It should be noted that the orientation vector in the embodiments of the present disclosure may be the orientation vector between the mark points on multiple scanning rods, or may be the orientation vector between the mark points on a single scanning rod.

In the second embodiment, a registration matrix is obtained by the coordinates of the third assembly sites in the first scanning data and the second scanning data. The coordinates in the second scanning data can be transformed into a coordinate system in the first scanning data based on the registration matrix to obtain the updated image of the second scanning data.

The first embodiment in the first implementation of step 300 will be described in conjunction with FIG. 3 and FIG. 4. Alternatively, the obtaining position information of the assembly sites in the scanned scene based on the first scanning data and the second scanning data includes:

an orientation vector between the scanning rods at the first assembly site and the third assembly site is determined based on the first scanning data;

an orientation vector between the scanning rods at the second assembly site and the third assembly site is determined based on the second scanning data; and the position information of the assembly sites in the scanned scene is determined based on the orientation vector between the scanning rods at the first assembly site and the third assembly site as well as the orientation vector between the scanning rods at the second assembly site and the third assembly site.

The above steps will be described in detail below. Alternatively, the obtaining position information of the assembly sites in the scanned scene based on the first scanning data and the second scanning data includes:

A1: the first scanning data and the second scanning data are analyzed to obtain the coordinates of the third assembly sites in the first scanning data and the second scanning data.

In some embodiments, mark points on each scanning rod are provided with mark points. For example, the scanning rod at the third assembly site A has multiple mark points a1, a2, a3, a4, and the like, and the scanning rod at the third assembly site B also has multiple mark points b1, b2, b3, b4, and the like. For a set of mark points (a1, b1), the distance between a1 and b1 is called a standard orientation vector. In the embodiments of the present disclosure, a set of mark points (a1, b1) is taken as an example, where the superscript of the coordinates represents the ordinal number of scanning where the image is scanned, and the subscript represents the mark point.

By analyzing the first scanning data, the coordinate of the mark point a1 on the scanning rod at the third assembly site A is $$(x_{a1}^1, y_{a1}^1, z_{a1}^1),$$

and the coordinate of the mark point b1 on the scanning rod at the third assembly site B is $$(x_{b1}^1, y_{b1}^1, z_{b1}^1).$$

By analyzing the second scanning data, the coordinate of the mark point a1 on the scanning rod at the third assembly site A is $$(x_{a1}^2, y_{a1}^2, z_{a1}^2),$$

and the coordinate of the mark point b1 on the scanning rod at the third assembly site B is $$(x_{b1}^2, y_{b1}^2, z_{b1}^2)$$

Since the position of the mark points on the scanning rods is fixed and unchanged, and the positions of the third assembly sites are also fixed and unchanged, the coordinates of the mark points on the scanning rods at the third assembly sites A and B in the first scanning data and the second scanning data should be unified, that is, $$(x_{a1}^1, y_{a1}^1, z_{a1}^1) = (x_{a1}^2, y_{a1}^2, z_{a1}^2), \text{ and } (x_{b1}^1, y_{b1}^1, z_{b1}^1) = (x_{b1}^2, y_{b1}^2, z_{b1}^2).$$

The first scanning data includes three-dimensional data of the mark points on the scanning rods at the third assembly sites A and B as well as three-dimensional data of the mark points on the scanning rod at the first assembly site C.

A2: a standard orientation vector between at least one pair of mark points on the scanning rods at the third assembly sites is obtained based on the coordinates of the third assembly sites in the first scanning data.

In some embodiments, the standard orientation vector refers to the distance between the mark points on the scanning rods at the third assembly sites in the first scanning data. Based on the coordinates $$\left(x_{a1}^1, y_{a1}^1, z_{a1}^1\right) \text{ and } \left(x_{b1}^1, y_{b1}^1, z_{b1}^1\right)$$

of the mark point a1 on the scanning rod at the third assembly site A and the mark point b1 on the scanning rod at the third assembly site B in the first scanning data, a standard orientation vector $$\left(x_{b1}^1 - x_{a1}^1, \ y_{b1}^1 - y_{a1}^1, \ z_{b1}^1 - z_{a1}^1\right)$$

between at least one pair of mark points on the scanning rods at the third assembly sites is obtained.

A3: a non-standard orientation vector between the mark points on the scanning rods at the third assembly sites in the second scanning data is determined based on the coordinates of the third assembly sites in the first scanning data in combination with the standard orientation vector between the at least one pair of mark points on the scanning rods at the third assembly sites.

In some embodiments, the non-standard orientation vector refers to the distance between the mark points on the scanning rods at the third assembly sites in the second scanning data. Since the third assembly sites are fixed and unchanged in the first scanning data and the second scanning data, the distance between the mark points on the scanning rods at the third assembly sites is also unchanged. It should be understood that $$\left(x_{a1}^1, y_{a1}^1, z_{a1}^1\right) = \left(x_{a1}^2, y_{a1}^2, z_{a1}^2\right), \left(x_{b1}^1, y_{b1}^1, z_{b1}^1\right) = \left(x_{b1}^2, y_{b1}^2, z_{b1}^2\right),$$

and the non-standard orientation vector $$\left(x_{b1}^2 - x_{a1}^2, y_{b1}^2 - y_{a1}^2, z_{b1}^2 - z_{a1}^2\right) = \left(x_{b1}^1 - x_{a1}^{1\prime} \ y_{b1}^1 - y_{a1}^1, \ z_{b1}^1 - z_{a1}^1\right)$$

can be obtained.

A4: an updated image of the second scanning data is obtained based on the non-standard orientation vector between the mark points on the scanning rods at the third assembly sites in the second scan data and the corresponding standard orientation vector.

In some embodiments, based on the standard orientation vector $$\left(x_{b1}^1 - x_{a1}^1, y_{b1}^1 - y_{a1}^1, z_{b1}^1 - z_{a1}^1\right)$$

and the non-standard orientation vector $$\left(x_{b1}^2 - x_{a1}^2, y_{b1}^2 - y_{a1}^2, z_{b1}^2 - z_{a1}^2\right)$$

of a set of mark points, there is a standard orientation vector and a non-standard orientation vector between every set of mark points. Based on the distances between all the mark points, the updated image of the second scanning data is calculated. The updated image includes three-dimensional data of the mark points on the scanning rods at the third assembly sites A and B, as well as three-dimensional data of the mark points on the scanning rod at the second assembly site D.

A5: the mark points on the scanning rods in the updated image and the first scanning data are identified, and the position information of the assembly sites in the scanned scene is obtained.

In some embodiments, image analysis is performed based on the updated image and the first scanning data, and the three-dimensional data information of the scanning rods at the sites A, B, C, and D is obtained based on the coordinates of the mark points on the scanning rods at the third assembly sites A and B as well as the coordinates of the mark points on the scanning rods at the first assembly site C and the second assembly site D, so as to obtain the position information of the sites A, B, C, and D.

The second embodiment in the first implementation of step 300 is be described in conjunction with FIG. 3 and FIG. 4. Alternatively, the assembling status of the scanning rods at the third assembly sites in the scanned scene in the first scanning rod assembling status is the same as the assembling status of the scanning rods at the third assembly sites in the scanned scene in the second scanning rod assembling status. The obtaining position information of the assembly sites in the scanned scene based on the first scanning data and the second scanning data further includes:

an orientation vector between mark points on a surface of the scanning rod at the third assembly site is determined based on the first scanning data;

an orientation vector between mark points on the surface of the scanning rod at the third assembly site is determined based on the second scanning data; and the position information of the assembly sites in the scanned scene is determined based on the orientation vectors between the mark points on the surface of the scanning rod at the third assembly site.

In some embodiments, alternative, the above steps can be refined as:

B1: the first scanning data and the second scanning data are analyzed to obtain the coordinates of the third assembly sites in the first scanning data and the second scanning data.

In some embodiments, by analyzing the first scanning data, the coordinate of the third assembly site A is $(x_{A1}, y_{A1}, z_{A1})$, and the coordinate of the third assembly site B is $(x_{B1}, y_{B1}, z_{B1})$. By analyzing the second scanning data, the coordinate of the third assembly site A is $(x_{A2}, y_{A2}, z_{A2})$, and the coordinate of the third assembly site B is $(x_{B2}, y_{B2}, z_{B2})$.

B2: a registration matrix of the first scanning data and the second scanning data is obtained based on the coordinates of the third assembly sites in the first scanning data and the second scanning data.

In some embodiments, the registration matrix k is obtained based on the four coordinates of the third assembly sites A and B in the first scanning data and the second scanning data obtained in step B1.

B3: image registration is performed on the second scanning data based on the registration matrix, and the second scanning data is converted to an image coordinate system of the first scanning data to obtain the updated image of the second scanning data.

In some embodiments, $(x_{A1}, y_{A1}, z_{A1})$ is obtained by multiplying $(x_{A2}, y_{A2}, z_{A2})$ by the matrix k, and $(x_{B1}, y_{B1}, z_{B1})$ is obtained by multiplying $(x_{32}, y_{B2}, z_{B2})$ by the matrix k. The second scanning data is converted into the image coordinate system of the first scanning data to obtain the updated image of the second scanning data, and the updated image includes the coordinates of the third assembly sites A and B and the coordinate of the second assembly site D.

B4: the position information of the assembly sites in the scanned scene is obtained based on the updated image and the first scanning data.

In the embodiments of the present disclosure, image analysis is performed based on the updated image and the first scanning data, and the position information of the sites A, B, C, and D is obtained based on the coordinates of the third assembly sites A and B, the first assembly site C, and the second assembly site D.

For the second method, the first scanning data is registered with the second scanning data to obtain the registered image for analysis. Alternatively, the obtaining position information of the assembly sites in the scanned scene based on the first scanning data and the second scanning data includes:

S1: the first scanning data is registered with the second scanning data to obtain the registered image; and S2: the position information of the assembly sites in the scanned scene is obtained based on the registered image.

Figure 6:
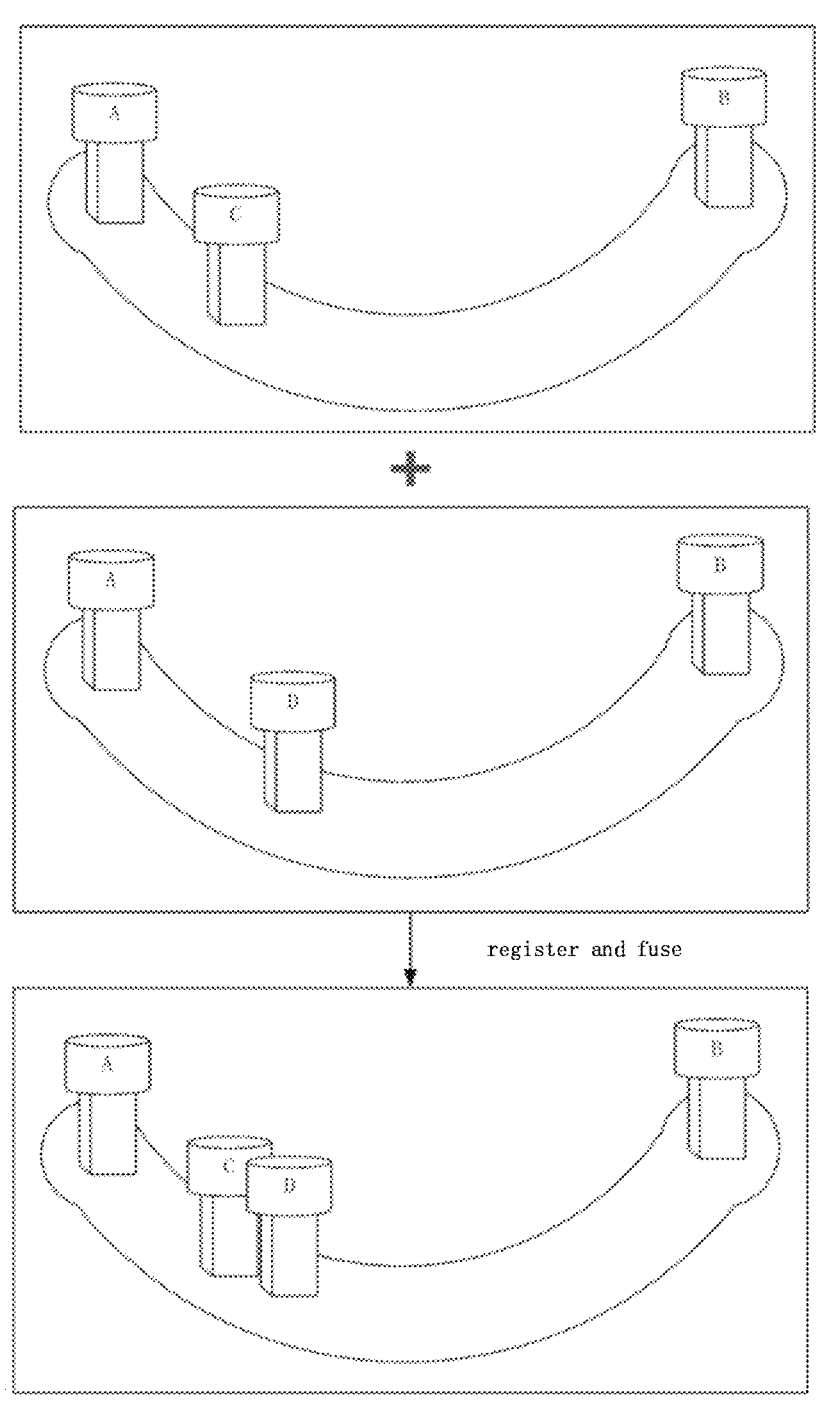
FIG. 6 is a schematic diagram of a process of acquiring a registered image provided in an embodiment of the present disclosure.

In some embodiments, as shown in FIG. 6, FIG. 6 provides a schematic diagram of a process of acquiring a registered image. The scanned scene in the first scanning rod assembling status and the scanned scene in the second scanning rod assembling status are scanned to obtain the first scanning data and the second scanning data. Two images are registered to obtain the registered image. The registered image includes three-dimensional data information of the third assembly sites A and B, as well as three-dimensional data information of the first assembly site C and the second assembly site D. The position information of each assembly site can be obtained by analyzing the registered image.

position information of the assembly sites in the scanned scene based on the registered image includes:

position information of the first assembly site, the second assembly site, and the third assembly sites is determined based on the feature patterns of all the scanning rods in the registered image; or, the scanning rods are provided with mark points, and the obtaining the position information of the assembly sites in the scanned scene based on the registered image includes:

relative position information among the first assembly site, the second assembly site, and the third assembly sites is determined based on the mark points on the scanning rods in the registered image.

Exemplarily, the scanning rods are provided with feature patterns, and the feature patterns on the scanning rods at the third assembly sites, the first assembly site, and the second assembly site in the registered image are analyzed to determine the position information of the first assembly site, the second assembly site, and the third assembly sites.

Exemplarily, the feature information of the scanning rods is provided with mark points, and the mark points on the scanning rods at the third assembly sites, the first assembly site, and the second assembly site in the registered image are identified to determine the position information of the first assembly site, the second assembly site, and the third assembly sites. By analyzing the feature patterns and the mark points on the scanning rods, the position information of the assembly sites corresponding to the scanning rods can be clearly analyzed, which is conducive to obtaining complete and accurate position information of the assembly sites in an oral cavity. It should be noted that in addition to the feature patterns and mark points, the scanning rods may also have other marks containing feature meanings for analysis and identification, which is not specifically limited here.

Figure 7:
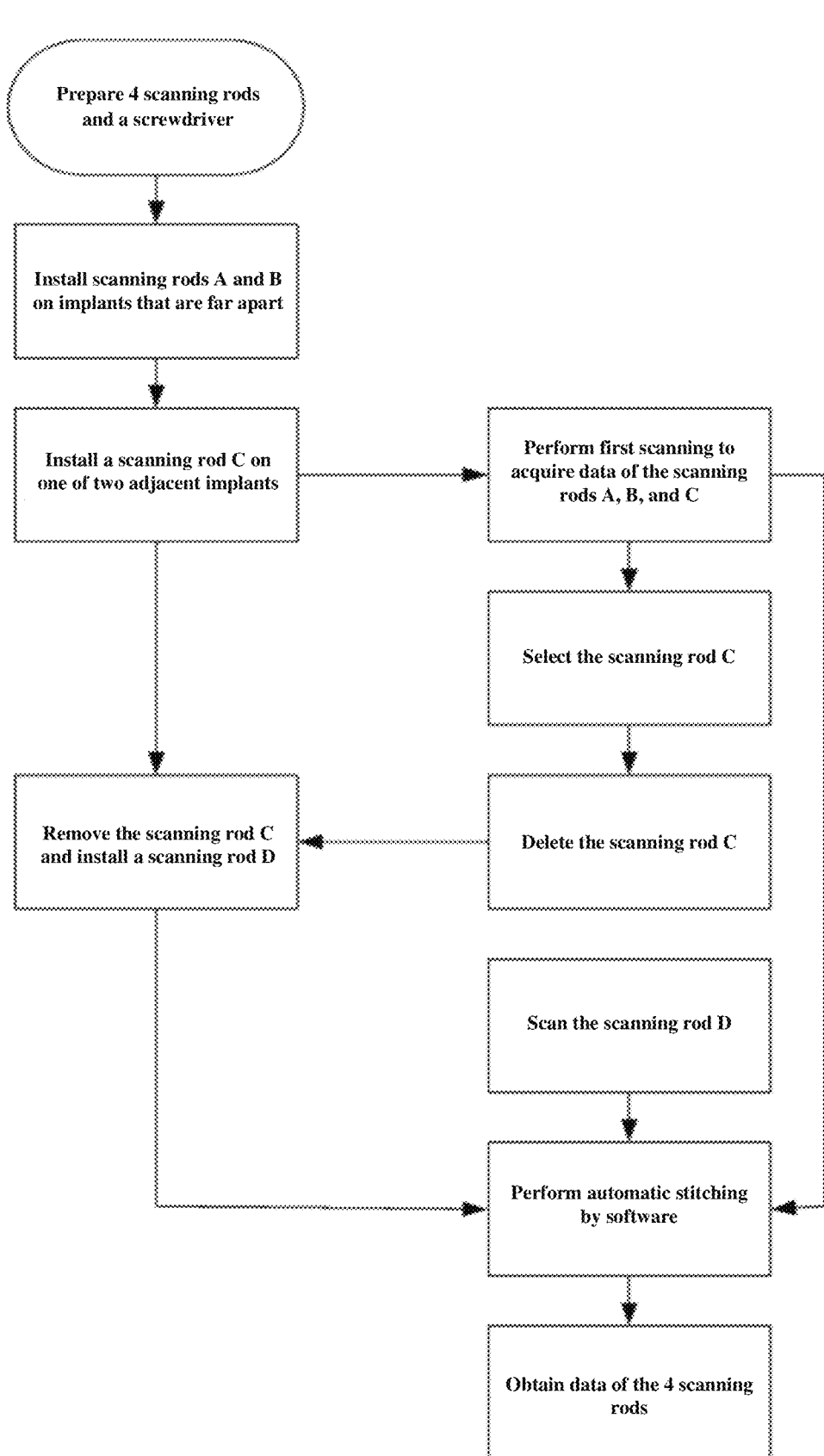
FIG. 7 is a scanning flowchart of a scanning rod provided in an embodiment of the present disclosure.

An embodiment of the present disclosure further provides a scanning flowchart of a scanning rod. As shown in FIG. 7, the situation of 4 implants is taken as an example. First, scanning rods are installed at two assembly sites A and B that are far apart, and one of two adjacent assembly sites is selected to install a scanning rod C. First scanning is performed, data of the scanning rods at positions A, B, and C is obtained by analysis, the data of the scanning rod at the site C is deleted, and the data of the scanning rods at the sites A and B is retained. The other assembly site of the two adjacent assembly sites is selected to install a scanning rod D. Second scanning is performed, data of the scanning rods at positions A, B, and D are obtained by analysis, and then the position data of the assembly sites of the scanning rods at the positions A, B, C, and D is obtained by register using software. By the aforementioned method, the problem that two scanning rods cannot be put in place simultaneously when adjacent implants are too close to each other is effectively solved, which is conducive to obtaining complete feature information of the scanning rods in an oral cavity, improving the matching degree of the scanning data, and thus facilitating accurate determination of the position information of the assembly sites.

Figure 8:
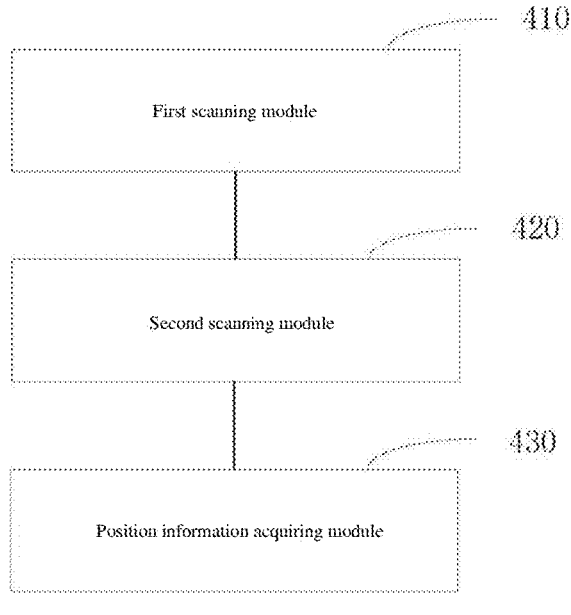
FIG. 8 is a schematic structural diagram of a scanning system of a scanning rod provided in an embodiment of the present disclosure.

Referring to FIG. 8, which shows a schematic structural diagram of a scanning system of a scanning rod provided in an embodiment of the present disclosure. For ease of description, only the parts related to the embodiments of the present disclosure are shown.

A scanning system 400 of a scanning rod may include the following modules:

a first scanning module 410, configured to scan a scanned scene in a first scanning rod assembling status to obtain first scanning data, where scanning rods are assembled at a third assembly site and a first assembly site in the scanned scene in the first scanning rod assembling status;

a second scanning module 420, configured to scan the scanned scene in a second scanning rod assembling status to obtain second scanning data, where the scanning rods are assembled at the third assembly site and a second assembly site in an oral cavity in the second scanning rod assembling status; and a position information acquiring module 430, configured to obtain position information of the assembly sites in the scanned scene based on the first scanning data and the second scanning data.

A distance between the first assembly site and the second assembly site is less than a preset threshold. An assembling status of the scanning rod at the third assembly site in the scanned scene in the first scanning rod assembling status is the same as an assembling status of the scanning rod at the third assembly site in the scanned scene in the second scanning rod assembling status.

The first scanning module 410 and the second scanning module 420 are alternative configured to:

scan the scanning rods at the first assembly site and the third assembly site to obtain the first scanning data when scanning the scanned scene in the first scanning rod assembling status;

acquire a display image based on the first scanning data;

cancel data of the scanning rod corresponding to the first assembly site in the display image, and scan the scanning rods at the second assembly site and the third assembly site to obtain the second scanning data when scanning the scanned scene in the second scanning rod assembling status; and update the display image based on the second scanning data.

The position information acquiring module 430 further includes an image updating module 431, an image register module 432, and an analysis and identification module 433. The image updating module 431 is alternative configured to:

determine an orientation vector between the scanning rods at the first assembly site and the third assembly site based on the first scanning data;

determine an orientation vector between the scanning rods at the second assembly site and the third assembly site based on the second scanning data; and determine position information of the assembly sites in the scanned scene based on the orientation vector between the scanning rods at the first assembly site and the third assembly site as well as the orientation vector between the scanning rods at the second assembly site and the third assembly site.

The image updating module 431 is further alternative configured to:

determine an orientation vector between mark points on a surface of the scanning rod at the third assembly site based on the first scanning data;

determine an orientation vector between the mark points on the surface of the scanning rod at the third assembly site based on the second scanning data; and determine the position information of the assembly sites in the scanned scene based on the orientation vectors between the mark points on the surface of the scanning rod at the third assembly site.

The image register module 432 is alternative configured to:

stitch the first scanning data with the second scanning data to obtain a registered image; and obtain the position information of the assembly sites in the scanned scene based on the registered image.

The analysis and identification module 433 is alternative configured to:

determine position information of the first assembly site, the second assembly site, and the third assembly sites based on feature patterns of all the scanning rods in the registered image; or, the scanning rods are provided with mark points, and the obtaining the position information of the assembly sites in the scanned scene based on the registered image includes:

relative position information among the first assembly site, the second assembly site, and the third assembly site is determined based on the mark points on the scanning rods in the registered image.

The scanning system of a scanning rod provided in the embodiment of the present disclosure can be applied to the aforementioned method embodiments. Reference may be made to the description of the aforementioned method embodiments for details, which are not repeated herein.

Figure 9:
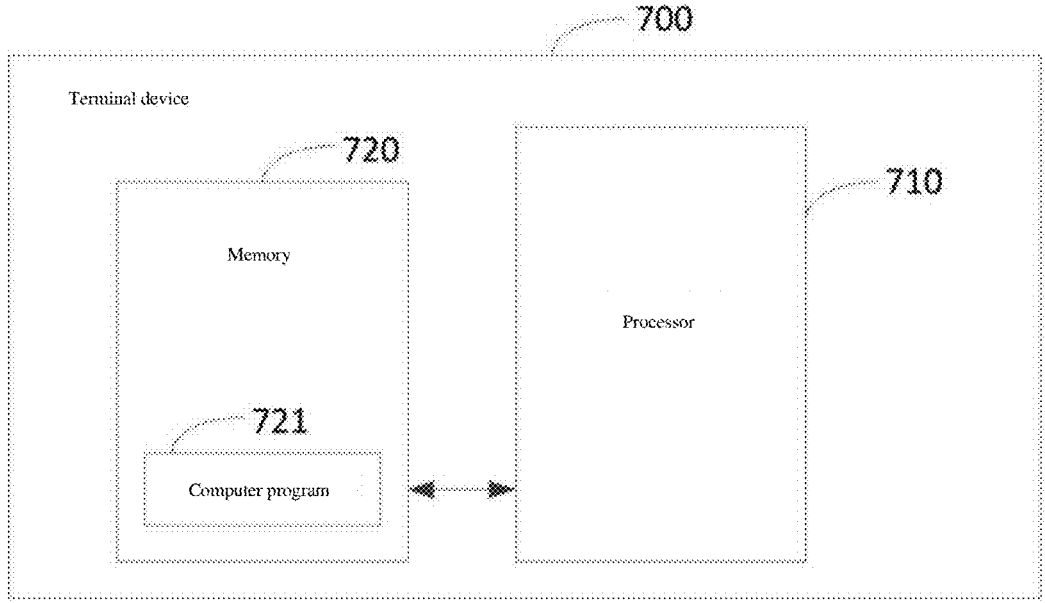
FIG. 9 is a schematic structural diagram of a terminal device provided in an embodiment of the present disclosure.

FIG. 9 is a schematic structural diagram of a terminal device provided in an embodiment of the present disclosure. As shown in FIG. 9, a terminal device 700 of some embodiments includes at least one processor 710 (only one is shown in FIG. 9), a memory 720, and a computer program 721 stored in the memory 720 and executable on the at least one processor 710. The processor 710 implements the steps of the aforementioned scanning method embodiment of a scanning rod when executing the computer program 721.

The terminal device 700 may be a computing device such as a desktop computer, a laptop, a handheld computer, and a cloud server. The terminal device may include, but is not limited to, the processor 710 and the memory 720. Those skilled in the art may understand that FIG. 9 is only an example of the terminal device 700 and does not constitute a limitation on the terminal device 700. More or fewer components than those shown in the diagram can be included, or certain components or different components can be combined, for example, an input/output device, a network access device, and the like may be included.

The processor 710 may be a central processing unit (CPU), and the processor 710 may also be other general-purpose processors, a digital signal processor (DSP), an application specific integrated circuit (ASIC), a field-programmable gate array (FPGA) or other programmable logic devices, a discrete gate or transistor logic device, a discrete hardware component, and the like. The general-purpose processor may be a microprocessor, or the processor may be any conventional processor and the like.

In some embodiments, the memory 720 may be an internal storage unit of the terminal device 700, e.g., a hard disk or internal storage of the terminal device 700. In some other embodiments, the memory 720 may also be an external storage device of the terminal device 700, e.g., a plug-in hard disk, a smart media card (SMC), a secure digital (SD) card, and a flash card equipped on the terminal device 700. Furthermore, the memory 720 may also include both an internal storage unit and an external storage device of the terminal device 700. The memory 720 is configured to store an operating system, an application program, a boot loader, data, and other programs, e.g., program code of the computer program. The memory 720 may also be configured to temporarily store data has been outputted or to be outputted.

Those skilled in the art may clearly understand that, for the sake of convenience and conciseness in description, only the division of the above functional units and modules is used as an example for illustration. In practical applications, the above function allocation may be completed by different functional units and modules according to needs, that is, the internal structure of the apparatus is divided into different functional units or modules to complete all or part of the functions described above. The functional units and modules in the embodiments may be all integrated into one processing unit, may also physically exist separately, or may be integrated into one unit by two or more units. The above integrated unit can be implemented in the form of hardware or in the form of software functional units. In addition, the specific names of the functional units and modules are only for the convenience of distinguishing each other, and are not intended to limit the scope of protection of the present disclosure. For specific work processes of the units and modules in the above system, reference may be made to the corresponding processes in the aforementioned method embodiments, which are not repeated herein.

In the aforementioned embodiments, the descriptions of the embodiments have respective focuses. For a part that is not described in detail or recorded in certain embodiment, reference can be made to related descriptions in other embodiments.

A person of ordinary skill in the art may notice that the exemplary units and algorithm steps described with reference to the embodiments disclosed in the present disclosure can be implemented in electronic hardware, or a combination of computer software and electronic hardware. Whether the functions are executed in hardware or software depends on particular applications and design constraint conditions of the technical solutions. A person skilled in the art may implement the described functions by using different methods for each particular application, but such implementation is not to be considered beyond the scope of the present disclosure.

In the embodiments provided by the present disclosure, it should be understood that the disclosed apparatus/terminal device and method may be implemented in other manners. For example, the described apparatus/network device embodiments are merely examples. For example, the module or unit division is merely logical function division and may be other division during actual implementation. For example, multiple units or components may be combined or integrated into another system, or some features may be ignored or not performed. In addition, the displayed or discussed mutual couplings or direct couplings or communication connections may be indirect couplings or communication connections through some interfaces, apparatuses or units and may be in an electrical, mechanical, or other form.

The units described as separate components may or may not be physically separated, and the components displayed as units may or may not be physical units, that is, may be located in one place or may be distributed over a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated units mentioned above can be implemented in both a hardware form and a software functional unit form.

The integrated modules/units, if implemented in the form of software functional units and sold or used as separate products, may be stored in a non-transitory computer readable storage medium. Based on such understanding, the present disclosure may also implement all or part of the processes in the method in the aforementioned embodiments by a computer program to instruct related hardware. The computer program may be stored in a non-transitory computer readable storage medium, and may implement the steps of the method in the embodiments described above when executed by a processor. The computer program includes computer program code. The computer program code may be in a source code form, an object code form, an executable file form, or some intermediate forms, etc. The computer readable medium may include any entity or apparatus capable of carrying the computer program code, a recording medium, a USB flash drive, a mobile hard disk, a magnetic disk, an optical disk, a computer memory, a read-only memory (ROM), a random access memory (RAM), electrical carrier signals, telecommunications signals, software distribution media, and the like. It should be noted that the content included in the computer readable medium may be appropriately increased or decreased according to the requirements of legislation and patent practice in the jurisdictions. For example, in some jurisdictions, according to legislation and patent practice, the computer readable medium does not include electrical carrier signals or telecommunications signals.

The present disclosure implements all or part of the processes in the method in the aforementioned embodiments, and may also be completed through a computer program product. The computer program product, when run on a terminal device, causes the terminal device to execute the steps in the aforementioned method embodiments.

The embodiments described above are only used for explaining the technical solutions of the present disclosure, and are not limited thereto. Although the present disclosure has been described in detail with reference to the aforementioned embodiments, those of ordinary skill in the art should understand that the technical solutions recorded in the aforementioned embodiments may still be modified, or some of the technical features may be replaced. Such modifications or replacements do not cause the essence of corresponding technical solutions to depart from the spirit and scope of the technical solutions of the respective embodiments of the 10 present disclosure, and are intended to be included within the protection scope of the present disclosure.

The invention claimed is:

1. A scanning method of a scanning rod, applied to a scanned scene with scanning rods, comprising:

scanning a scanned scene in a first scanning rod assembling status to obtain first scanning data, wherein scanning rods are assembled at a third assembly site and a first assembly site in the first scanning rod assembling status;

scanning the scanned scene in a second scanning rod assembling status to obtain second scanning data, wherein the scanning rods are assembled at the third assembly site and a second assembly site in the scanned scene in an oral cavity in the second scanning rod assembling status; and obtaining position information of the assembly sites in the scanned scene based on the first scanning data and the second scanning data;

wherein the method further comprises:

acquiring a display image based on the first scanning data;

when scanning the scanned scene in the second scanning rod assembling status, cancelling data of the scanning rod corresponding to the first assembly site in the display image, and scanning the scanning rods at the second assembly site and the third assembly site to obtain the second scanning data; and updating the display image based on the second scanning data.

2. The method as claimed in claim 1, wherein a distance between the first assembly site and the second assembly site is less than a preset threshold.

3. The method as claimed in claim 2, wherein a distance between the first assembly site and the third assembly site is greater than the preset threshold, and a distance between the second assembly site and the third assembly site is greater than the preset threshold.

4. The method as claimed in claim 2, wherein the preset threshold is determined based on a fixed value and diameters of the scanning rods.

5. The method as claimed in claim 1, wherein an assembling status of the scanning rod at the third assembly site in the scanned scene in the first scanning rod assembling status is the same as an assembling status of the scanning rod at the third assembly site in the scanned scene in the second scanning rod assembling status, and the obtaining the position information of the assembly sites in the scanned scene based on the first scanning data and the second scanning data further comprises:

registering the first scanning data with the second scanning data to obtain a registered image; and obtaining the position information of the assembly sites in the scanned scene based on the registered image.

6. The method as claimed in claim 5, wherein the scanning rods are provided with feature patterns, and the obtaining the position information of the assembly sites in the scanned scene based on the registered image comprises: determining the position information of the first assembly site, the second assembly site, and the third assembly site based on the feature patterns of all the scanning rods in the registered image; or, the scanning rods are provided with mark points, and the obtaining the position information of the assembly sites in the scanned scene based on the registered image comprises:

determining relative position information among the first assembly site, the second assembly site, and the third assembly site based on the mark points on the scanning rods in the registered image.

7. The method as claimed in claim 5, wherein registering the first scanning data with the second scanning data to obtain the registered image comprises:

registering the first scanning data with the second scanning data based on the mark points at the third assembly site in the first scanning data and the second scanning data.

8. The method as claimed in claim 1, wherein obtaining the position information of the assembly sites in the scanned scene based on the first scanning data and the second scanning data comprises:

determining an orientation vector between the scanning rods at the first assembly site and the third assembly site based on the first scanning data;

determining an orientation vector between the scanning rods at the second assembly site and the third assembly site based on the second scanning data; and determining the position information of the assembly sites in the scanned scene based on the orientation vector between the scanning rods at the first assembly site and the third assembly site as well as the orientation vector between the scanning rods at the second assembly site and the third assembly site.

9. The method as claimed in claim 1, wherein an assembling status of the scanning rod at the third assembly site in the scanned scene in the first scanning rod assembling status is the same as an assembling status of the scanning rod at the third assembly site in the scanned scene in the second scanning rod assembling status, and obtaining the position information of the assembly sites in the scanned scene based on the first scanning data and the second scanning data further comprises:

determining an orientation vector between mark points on a surface of the scanning rod at the third assembly site based on the first scanning data;

determining an orientation vector between the mark points on the surface of the scanning rod at the third assembly site based on the second scanning data; and determining the position information of the assembly sites in the scanned scene based on the orientation vectors between the mark points on the surface of the scanning rod at the third assembly site.

10. The method as claimed in claim 1, wherein the first assembly site and the second assembly site are two assembly sites where the scanning rods interfere with each other, and the third assembly site is an assembly site where there is no interference with the first assembly site and the second assembly site.

11. The method as claimed in claim 1, wherein the method further comprises:

scanning mark points on the scanning rods;

generating three-dimensional scanning data of the scanning rods based on the mark points;

generating a scanned image based on the three-dimensional scanning data of the scanning rods.

12. The method as claimed in claim 1, wherein obtaining position information of the assembly sites in the scanned scene based on the first scanning data and the second scanning data comprises:

updating the second scanning data based on the first scanning data to obtain an updated image of the second scanning data, wherein the updated image of the second scanning data includes coordinates of the third assembly site and the second assembly site.

13. The method as claimed in claim 1, wherein the method further comprises:

obtaining a registration matrix by coordinates of the third assembly sites in the first scanning data and the second scanning data;

transforming the coordinates in the second scanning data into a coordinate system in the first scanning data based on the registration matrix to obtain the updated image of the second scanning data.

\* \* \* \* \*